Patented Feb. 5, 1952

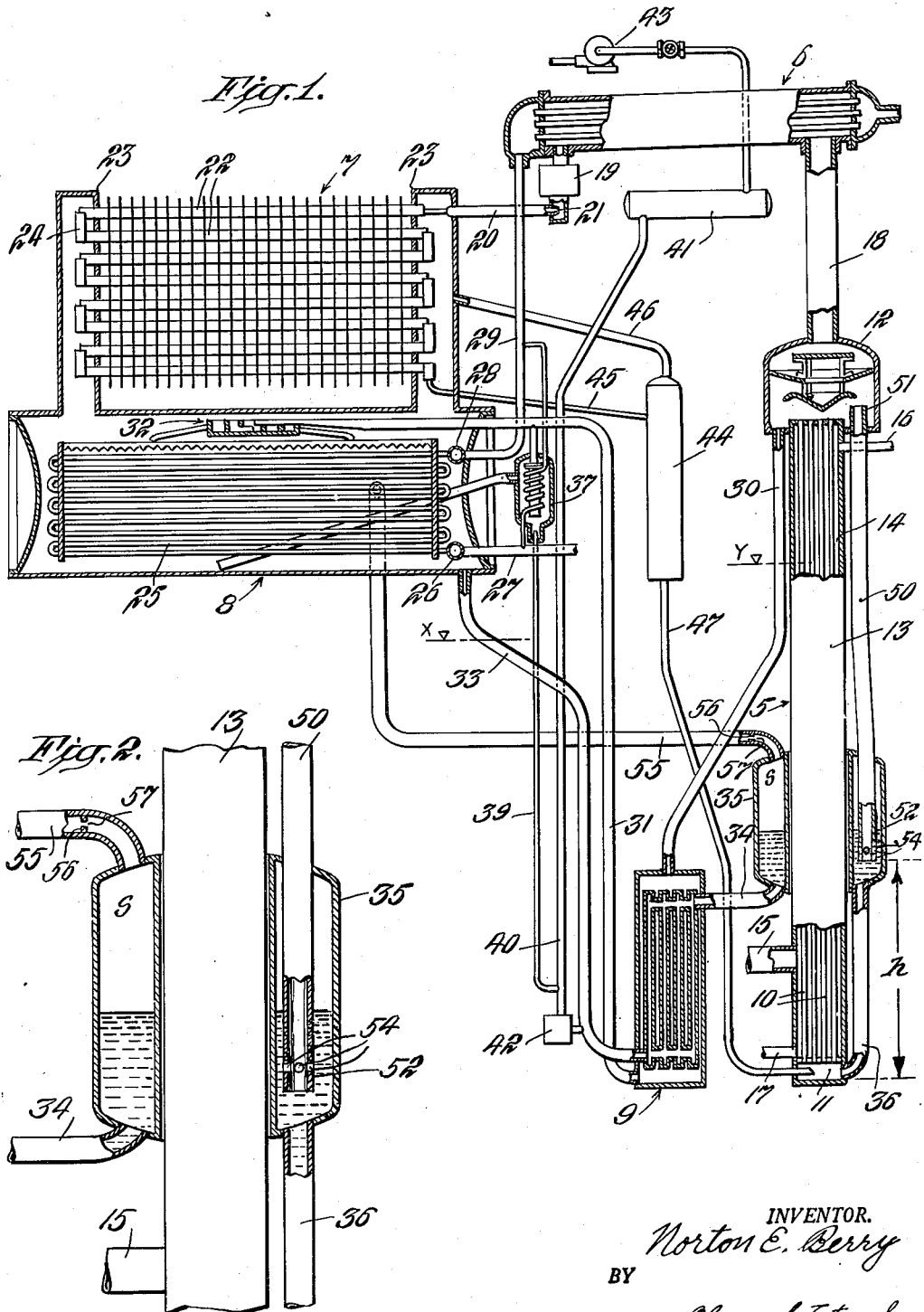

2,584,250

UNITED STATES PATENT OFFICE 2,584,250

SOLUTION PREHEATER FOR ABSORPTION REFRIGERATION SYSTEMS

Norton E. Berry, Newburgh, Ind., assignor to Servel, Inc., New York, N. Y., a corporation of Delaware Application April 9, 1947, Serial No. 740,321

5 Claims. (Cl. 62—119)

The present invention relates to absorption refrigeration systems and more particularly to a method of and apparatus for preheating the solution flowing to the generator of such systems.

The present invention is particularly adapted for use with a vacuum type absorption refrigeration system as illustrated and described in the United States Letters Patent of Albert R. Thomas et al. No. 2,301,232 issued November 10, 1942, and entitled Refrigeration. This type of refrigeration system uses a refrigerant such as water and an absorbent such as a hygroscopic salt, sulphuric acid, potash, or the like. The generator preferably comprises a number of upright tubes in which absorption solution is heated by a heating medium supplied to a chamber surrounding the tubes and the generator constitutes a lift for raising solution in the tubes by vapor lift action.

Absorption solution strong in refrigerant flows from the absorber to the generator and arrives at the generator at a temperature below its boiling point. As the solution enters the generator tubes it will tend to condense bubbles of refrigerant vapor formed on the walls of the tubes. Under certain conditions of operation, particularly with low temperature cooling water, the relatively cold solution entering the generator accentuates the condensation and collapse of vapor bubbles with a resultant cracking sound or noise.

One of the objects of the present invention is to provide a method of and apparatus for preheating the solution flowing toward the generator to decrease the rate at which the vapor bubbles collapse therein and the amount of noise emitted therefrom.

Another object of the invention is to utilize a portion of the refrigerant vapor expelled in the generator for heating and agitating the solution flowing toward the generator.

Still another object is to utilize the flow of refrigerant vapor from the top of the generator into a pool of solution above the base of the generator to stabilize the reaction head on the tubes of the generator and maintain a more constant rate of circulation of absorbent through the system.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of an absorption refrigeration system incorporating the preheating apparatus of the present invention, and Fig. 2 is an enlarged sectional view of the reservoir vessel for supplying absorption liquid to the generator and showing the end of a vapor pipe for bubbling refrigerant vapor through absorption solution therein.

In accordance with the method of the present invention, absorption solution from the absorber is delivered to a pool of solution at a level above the base of the generator. The pool of solution above the base of the generator constitutes a reservoir from which solution flows continuously to the base of the generator and also maintains a liquid column therebetween to provide a reaction head on the solution in the generator tubes. The tubes of the generator are heated to expel refrigerant vapor from solution and the expelled vapor is utilized to lift the solution in the tubes by vapor lift action. At the top of the generator the refrigerant vapor is separated from solution and the refrigerant vapor has a vapor pressure equal to or greater than the condensing pressure. The space above the pool or reservoir, on the other hand, has a vapor pressure corresponding to the temperature of the solution at its particular concentration which is lower than the vapor pressure of the refrigerant vapor leaving the generator. This difference in vapor pressures is utilized to cause a flow of relatively hot refrigerant vapor into the pool of absorption solution below its liquid level.

As the refrigerant vapor bubbles through the pool of solution it agitates the solution and condenses therein to uniformly increase the sensible heat and temperature of the solution. The rate at which the refrigerant vapor is supplied to the solution is regulated automatically by the difference in their vapor pressures. Non-condensable gases are continuously purged from the space above the pool of refrigerant as the accumulation of such gases might increase the total pressure to the point of interfering with the flow of refrigerant vapor into solution. It also has been found that the method of preheating in accordance with the present invention maintains a more constant reaction head and rate at which solution is lifted in the tubes of the generator. When refrigerant vapor is delivered into the pool of solution below its liquid level the reaction head is equal to the refrigerant vapor pressure from the generator plus the hydrostatic head of a column of solution of a height determined by the level at which the refrigerant vapor is introduced into the solution.

With a more constant reaction head a more constant rate of circulation of absorbent results.

In the drawing, an absorption refrigeration system is illustrated which incorporates apparatus for preheating absorption solution in accordance with the method of the present invention. The refrigeration system is of the vacuum type illustrated and described in the Thomas et al. patent, referred to above, which utilizes water as a refrigerant and a hygroscopic salt such as lithium bromide as an absorbent. The refrigeration system comprises a generator 5, a condenser 6, an evaporator 7, an absorber 8 and a heat exchanger 9 interconnected to provide paths of flow for refrigerant and absorbent. The generator 5 comprises a plurality of upright tubes 10 connected at their lower ends to an inlet chamber 11 and at their upper ends to a separating chamber 12. The tubes 10 are enclosed in a jacket 13 to provide a heating chamber 14 therebetween. Steam is supplied to the heating chamber 14 from a suitable source, such as a boiler, through a conduit 15 and a vent pipe 16 maintains the steam in the heating chamber at atmospheric pressure. A condensate drain pipe 17 is provided adjacent the lower end of the heating chamber 14.

The separating chamber 12 of the generator 5 is connected to the condenser 6 by a conduit 18 and the condenser, in turn, is connected to the evaporator 7 by a conduit including a liquid receiving vessel 19 and a pipe 20 having an orifice 21 at its end. The orifice 21 at the end of the conduit 20 is of such size as to pass all of the liquid refrigerant condensed in the condenser 6 and permit a limited flow of refrigerant vapor to purge non-condensable gases from the condenser as claimed in my copending application for Letters Patent Serial No. 725,000 filed January 29, 1947 and entitled Refrigeration, now Patent No. 2,563,575. Evaporator 7 comprises a plurality of substantially horizontal tubes 22 extending between headers 23. Cups 24 at the end of the tubes 22 in the headers 23 receive refrigerant flowing from the tube above so that the refrigerant flows successively through the tubes from the top to the bottom of the evaporator. The headers 23 open into the top of the absorber 8 so that refrigerant vapor evaporated in the evaporator may flow into the absorber. Mounted in the absorber 8 are banks of cooling coils 25 to which cooling water is supplied through a header 26 and supply pipe 27 from any suitable source such as a city water main, cooling tower, or the like. Cooling water from the bank of cooling coils 25 is delivered through a header 28 and conduit 29 to the inlet of the condenser 6.

Absorption solution weak in refrigerant or, in other words, concentrated salt solution, flows by gravity from the separating chamber 12 to the top of the absorber 8 in a path of flow including the conduit 30, heat exchanger 9, conduit 31 and liquid distributor 32. The absorption solution is divided by the liquid distributor 32 for flow over the banks of cooling coils 25 in the absorber 8. Absorption solution strong in refrigerant or, in other words, dilute salt solution, flows by gravity from the bottom of the absorber 8 to the inlet chamber 11 of the generator 5 in a path of flow including the conduit 33, heat exchanger 9, conduit 34, reservoir vessel 35 and conduit 36. The reservoir vessel 35 is positioned above the base of the generator 5 to continuously supply absorption solution to the inlet chamber 11 and maintain a liquid column in conduit 36 to provide a reaction head on the solution in the generator tubes 10. To conserve space the reservoir vessel 35 is of annular form and surrounds the jacket 13 of the generator 5 in spaced relation thereto.

The generator 5 and condenser 6 operate at a pressure corresponding substantially to the vapor pressure of the refrigerant at its condensing temperature and the evaporator 7 and absorber 8 operate at a lower pressure corresponding to the vapor pressure of the refrigerant at the evaporator temperature. The difference in pressures in the condenser 6 and evaporator 7 is maintained by the orifice 21 and the difference in pressures in the absorber 8 and generator 5 is maintained by liquid columns in the conduits 31 and 33. The liquid level in the conduit 33 is indicated by the reference character X while the liquid level in the conduit 30 connected to the conduit 31 through the heat exchanger 9 is indicated by the reference character Y.

A purging device 37 of the type illustrated and described in United States Letters Patent to Charles A. Roswell No. 2,384,861 issued September 18, 1945, is provided for continuously withdrawing non-condensable gases from the absorber 8 and transferring them to an inactive part of the system. Suffice it to state herein that the purging device 37 is in the form of an auxiliary absorber connected to withdraw non-condensable gas from the absorber 8 and deliver it between alternate slugs of absorption solution through a fall tube 39 into a riser tube 40. The non-condensable gas ascends in the riser tube 40 to a storage vessel 41 and the absorption solution flows through the connection 42 to the return conduit 33. The non-condensable gas may be removed from the storage vessel 41 from time to time by an exhaust pump 43.

A concentration vessel 44 of the type claimed in a copending application of Lowell McNeely, Serial No. 539,620, filed June 10, 1944, now Patent No. 2,465,904, is connected to the lowermost cup 24 in the evaporator 7 by a conduit 45 and to a header of the evaporator by a conduit 46. The lower end of the concentration vessel 44 is connected to the inlet chamber 11 of the generator 5 by a conduit 47. As thus far described the refrigeration system is substantially identical with those previously used.

In accordance with the present invention a portion of the refrigerant vapor expelled in the generator 5 is utilized to preheat absorption solution flowing toward the generator. To this end a tube 50 is connected between the separating chamber 12 and reservoir vessel 35. The upper end 51 of the tube 50 extends above the top of the generator tubes 10 into the vapor space in the separating chamber 12 and its lower end 52 extends into the solution in the vessel 35. As illustrated most clearly in Fig. 2, the end of the tube 50 is open and the portion 52 of the tube immersed in the absorption solution has a plurality of perforations or holes 54 arranged at substantially the same level. Due to the difference in the vapor pressure of refrigerant in the separating chamber 12 and the vapor pressure of solution in the space S in the reservoir vessel 35, respectively, refrigerant vapor from the separating chamber flows through the conduit 50 and bubbles through the solution to agitate and preheat the solution. The flow of refrigerant vapor into the pool of solution in the vessel 35 below its liquid level also acts to stabilize the reaction head on the generator tubes 10 at a value corresponding to a column of solution from the base of the generator 5 to the place where vapor issues from the vapor tube 50.

To prevent the accumulation of non-condensable gases in the space S of the reservoir vessel 35, a conduit 55 is connected between the top of the reservoir vessel and the absorber 8. A septum 56 is provided in the conduit 55 having a measuring orifice 57 therein for limiting the flow of refrigerant vapor to a predetermined small amount while purging any non-condensable gases which may occur in the reservoir vessel. One form of the invention having now been described in detail the mode of operation of the complete apparatus is explained as follows.

When steam is supplied through the conduit 15 to the heating chamber 14 of the generator 5, the latent heat of vaporization of the steam is transmitted through the walls of the tubes 10 to heat the solution in the tubes and vaporize refrigerant therefrom. As the heating chamber 14 is vented to the atmosphere by the vent pipe 16 the steam will be maintained at a temperature of 212° F., but due to the low pressure in the generator tubes the solution will boil at a much lower temperature. The refrigerant vapor formed in the generator tubes 10 will raise the absorption solution into the separating chamber 12. The refrigerant vapor is separated from the absorption solution in the separating chamber 12 and flows through the conduit 18 into the condenser 6 where it is liquefied by the transfer of its latent heat of vaporization to the cooling water flowing therethrough. The liquid refrigerant flows from the condenser 6 into the receiving vessel 19 and through the orifice 21 and conduit 20 into the uppermost tube 22 of the evaporator 7. The liquid refrigerant flows successively through the tubes 22 and is evaporated at a low pressure and temperature to cool air flowing over the tubes. Refrigerant vapor from the evaporator 7 flows through the headers 23 into the absorber 8 where it is absorbed in absorption solution delivered thereto from the separating chamber 12 of the generator, the rapid absorption of refrigerant vapor in the absorber maintaining a low pressure and temperature in the evaporator.

Absorption solution strong in refrigerant continuously flows from the bottom of the absorber 8 to the reservoir vessel 35 in a path of flow including the conduit 33, heat exchanger 9 and conduit 34. Although the relatively cool absorption solution flowing from the absorber 8 is heated in the heat exchanger 9 by the relatively hot solution flowing toward the absorber, the solution arrives in the reservoir vessel at a temperature considerably below the boiling point of the solution. The pressure in the space S in the vessel 35 will correspond to the vapor pressure of the solution at its particular temperature and concentration which is well below the vapor pressure of the refrigerant vapor in separating chamber 12.

Due to the difference in vapor pressures in the separating chamber 12 and space S, refrigerant vapor will flow through the tube 50 and perforations 54 at the lower end portion 52 of the tube and will bubble through the solution in the reservoir vessel. As the refrigerant vapor bubbles through the solution, it condenses and transfers its latent heat of vaporization to the solution. Simultaneously the bubbling vapor agitates the solution whereby to uniformly preheat the solution to a temperature approaching the boiling point of the solution. Thus, the solution entering the lower ends of the generator tubes 10 will decrease the rate at which vapor bubbles are condensed and thereby decrease the amount of noise caused by the collapse of the vapor bubbles.

Furthermore, it has been found that with the pot-heater arrangement of the present invention, the reaction head on the tubes 10 of the generator 5 is stabilized at a value corresponding to the liquid column in the conduit 36 from the base of the generator to the lowest place where refrigerant vapor issues from the submerged end portion 52 of the tube 50 such as the perforations 54 or its open end as indicated by the reference character $h$. Such stabilizing of the reaction head operates to stabilize the rate of circulation of absorbent which further decreases the noise produced in the generator.

Non-condensable gases occurring in the space S in the reservoir vessel 35 are continuously purged with refrigerant vapor through the conduit 55 to the absorber 8 at lower pressure. The orifice 57 limits the rate of flow of refrigerant vapor from the space S to a negligible amount due to the tremendous volume of the gases and refrigerant vapor at the low pressure in the system.

It will now be observed that the present invention provides a method of and apparatus for preheating the solution flowing toward the generator to decrease the noise emitted therefrom. It also will be observed that the present invention utilizes a portion of the refrigerant vapor expelled in the generator for heating and agitating the solution delivered to the generator and maintaining a more constant rate of circulation of absorbent. It will still further be observed that the present invention provides a simple construction and arrangement of elements for stabilizing the reaction head on the solution in the generator tubes and the rate of circulation of absorbent therein.

While only a single embodiment of the invention is illustrated and described, it will be understood that modifications may be made in the construction and arrangement of elements without departing from the spirit and scope of the invention. Therefore, without limiting myself in this respect the invention is defined by the following claims.

I claim:

1. A generator for a two-pressure absorption refrigeration system comprising a riser tube, a conduit for delivering absorption solution strong in refrigerant to the lower end of said tube, means for heating the tube to expel refrigerant vapor from solution therein, a conduit for withdrawing refrigerant vapor from the upper end of said tube, and a conduit connecting said vapor and solution conduits and extending into the solution flowing toward the generator for delivering a portion of the refrigerant vapor into the solution.

2. A generator for a two-pressure absorption refrigeration system comprising a vertical tube, an inlet chamber at the lower end of the tube for receiving absorption solution strong in refrigerant and a chamber at the upper end of the tube for separating refrigerant vapor from absorption solution, a vapor conduit for delivering refrigerant vapor from the separating chamber to a condenser, a conduit separate from and independent of the vapor conduit for introducing absorption solution strong in refrigerant into the inlet chamber comprising a reservoir vessel above the base of the vertical tube, and a conduit connecting the separating chamber and reservoir vessel with its end extending below the surface of the liquid in the vessel to bubble refrigerant vapor from the separating chamber into the solution at a predetermined distance above the base of the generator to preheat the solution and maintain a substantially constant reaction head on the tube.

3. The method of refrigeration with the aid of a two pressure absorption refrigeration system having a generator which comprises continuously delivering absorption solution to the generator in one path of flow, expelling refrigerant vapor from solution in the generator by the application of heat, directing expelled vapor from the generator in a second path of flow separate from and independent of said one path of flow, bleeding vapor from said second path of flow and directing it into the solution in the first path of flow below the surface level, and utilizing the difference in the vapor pressures of the expelled refrigerant vapor and solution flowing toward the generator to cause a portion of the refrigerant vapor to flow into the solution to preheat the solution.

4. The method of decreasing the noise emitted from the generator of a vacuum type two pressure absorption refrigeration system utilizing water as a refrigerant and a salt solution as an absorbent which comprises continuously delivering absorption solution to the generator in one path of flow, maintaining a pool of absorption solution in said path of flow above the base of the generator, expelling refrigerant vapor from solution in the generator by the application of heat, directing expelled vapor from said generator in a path of flow separate from and independent of the first path of flow, bleeding the vapor from said second path of flow and directing it into said pool of solution below its surface level in the first path of flow, and utilizing the difference in the vapor pressures of the expelled refrigerant vapor and solution to cause a portion of the refrigerant vapor to flow into the pool of solution to uniformly preheat the solution.

5. The method of refrigeration with the aid of a two pressure absorption type refrigeration system having a generator with a vapor liquid-lift tube which comprises continuously delivering absorption solution to the generator in one path of flow, maintaining a pool of absorption solution in said path of flow at a level above the base of the generator to maintain a liquid column on the vapor liquid-lift, expelling refrigerant vapor from solution in the generator by the application of heat, utilizing the expelled refrigerant to lift solution in the lift tube, directing expelled vapor from the vapor liquid-lift in a second path of flow separate from and independent of said first path of flow, bleeding vapor from said second path of flow and directing it into said pool of solution below its surface level in the first path of flow, and utilizing the difference in the vapor pressures of the expelled refrigerant vapor and solution to cause a portion of the refrigerant vapor to flow into the pool of solution below its liquid level to preheat the solution and maintain a substantially constant reaction head on the vapor liquid-lift tube.

NORTON E. BERRY.

REFERENCES CITED

The following references are of record in the file of this patent:

UNITED STATES PATENTS

| Number | Name | Date |
|---|---|---|
| 1,134,269 | Hiester et al. | Apr. 6, 1915 |
| 2,238,138 | Taylor | Apr. 15, 1941 |
| 2,357,340 | Miller | Sept. 5, 1944 |
| 2,357,612 | Soroka | Sept. 5, 1944 |